April 2, 1940.　　　F. A. McDONALD　　　2,195,492
QUICK COUPLING
Filed June 21, 1938
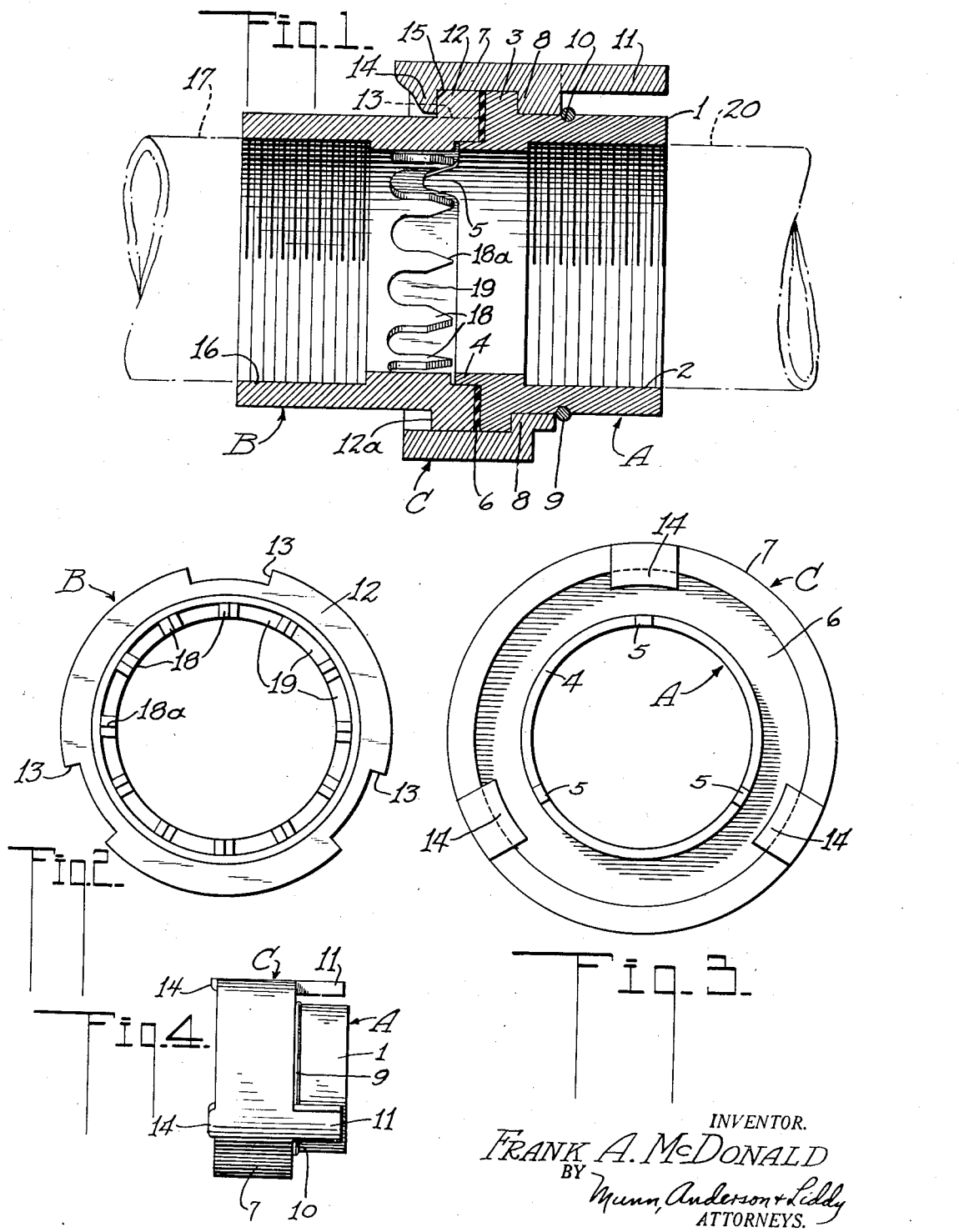
INVENTOR.
FRANK A. McDONALD
BY Munn, Anderson + Liddy
ATTORNEYS.

Patented Apr. 2, 1940

2,195,492

UNITED STATES PATENT OFFICE 2,195,492

QUICK COUPLING

Frank A. McDonald, San Francisco, Calif.

Application June 21, 1938, Serial No. 214,883

2 Claims. (Cl. 285—175)

My invention relates to improvements in a quick coupling, and it consists of the combinations, constructions and arrangements hereinafter described and claimed.

An object of my invention is to provide a quick coupling in which the tail piece and the body member may be quickly attached to each other regardless of the rotational angular position they assume with each other. Another vital feature is the provision of novel means carried by the tail piece and the body for interconnecting the two together in a manner that will prevent rotational movement between them, when they are connected by a coupling sleeve or handle. The body member is preferably attached to a pipe while the tail piece is usually connected to a hose. Any tendency of the hose to rotate the tail piece in the coupling will be prevented by the means which locks the tail piece to the body and prevents rotational movement between the parts. In this way, the coupling sleeve or handle will not be accidently rotated to free the two parts of the coupling.

A further object of my invention is to provide a device of the type described which is simple in construction and which is durable and efficient for the purpose intended.

Other objects and advantages will appear in the following specification, and the novel features of the device will be particularly pointed out in the appended claims.

My invention is illustrated in the accompanying drawing forming a part of this application, in which Figure 1 is a longitudinal section through the device;

Figure 2 is an end view of the tail piece;

Figure 3 is an end view of the body; and

Figure 4 is a side elevation of the body shown on a reduced scale.

In carrying out my invention, I provide a coupling consisting of a body A, a tail piece B, and a sleeve C. The body A has a cylindrical member 1 internally threaded at 2 for a portion of its length. One end of the cylinder 1 has an annular, outwardly extending flange 3 and a reduced portion 4 of the cylinder extends beyond the flange and is provided with one or more fingers 5. In Figure 3, I show three fingers 5. The reduced portion 4 constitutes a longitudinally extending flange. A gasket 6 is placed on the face of the flange 3 and is concentric with the reduced cylindrical portion or flange 4.

The coupling sleeve handle C is rotatably mounted on the body A and has a cylindrical portion 7 rotatably mounted on the peripheral edge of the flange 3, and also rides on the cylindrical portion 1. The sleeve 7 has an inwardly extending flange 8 that rotatably bears against the flange 3. A split ring 9 is received in a groove 10 formed in the cylinder 1 and this ring bears against the opposite side of the flange 8 to that contacted by the flange 3. This permits rotational movement of the handle C on the cylinder 1, but prevents longitudinal movement. The handle C carries a plurality of projections or hand grip portions 11 and I have shown three of these projections in the drawing.

The sleeve 7 extends beyond the flange 3 and is designed to receive a flange 12 carried by the tail piece B. Figure 2 shows the flange 12 of the tail piece B as being provided with recesses 13 and Figure 3 shows the handle C provided with inwardly extending projections 14 that are adapted to pass through the recesses 13 of the member C when the parts A and B are coupled together. The projections 14 have shoulders 15 for engaging with the flange 12 after the tail piece B has been moved into contact with the gasket 6 and then rotated. The flange 12 has cam edges 12a so inclined that as the handle C is rotated with respect to the member B in a clock-wise direction when looking at Figure 3, the projections or lugs 14 will ride upon the cam edges 12a and will frictionally bind the tail piece B to the body A. In this way, a water-tight seal is formed between the two parts.

The tail piece B has a threaded portion 16 for receiving a hose 17. The tail piece also has inwardly and longitudinally extending projections 18 spaced from each other to provide longitudinally extending recesses or grooves 19 and designed to receive the fingers 5. Figure 2 shows twelve projections 18. It is obvious that this number may be changed at will.

From the foregoing description of the various parts of the device, the operation thereof may be readily understood.

The body A is normally connected to a fixed pipe 20. The hose 17 with the tail piece B is now moved into engagement with the body A, after the handle C has been rotated into a position to align the lugs 14 with the recesses 13. It is easier to rotate the handle C rather than to rotate or twist the hose 17 in order to align the recesses with the projections. The projections 18 have pointed ends 18a and therefore the fingers 5 will be guided into the recesses 19 regardless of the rotational position the tail piece B assumes with the body A. In other words, the tail piece B and hose 17 need not be rotated to any appreciable extent when coupling the tail piece to the body A. When the fingers 5 enter the recesses 19, they will lock the body A to the tail piece B and prevent any rotational movement between the parts.

The handle C may now be rotated for bringing the lugs 14 into frictional engagement with the cam edges 12a. In rotating the handle C, the operator can grasp two of the projections 11 which is easier than grasping the sleeve which is of a large diameter. It will be noted that the engagement of the fingers 5 with the projections 18 will prevent the hose 17 and the tail piece B from rotating with respect to the body A and this in turn will prevent the tail piece B from rotating the handle C and causing the parts to become accidently uncoupled. The device therefore has the advantage of quick coupling without the disadvantage of becoming accidently uncoupled. The flange 4 cooperates with the gasket 6 to form a water-tight fit between the parts. The gasket 6 forms a seat in the body A for receiving the inner face of the tail piece B.

While I have shown only the preferred form of my invention, it should be understood that various changes or modifications may be made within the scope of the appended claims without departing from the spirit of the invention.

I claim:

1. A quick coupling for use between a twistable hose and a relatively stationary pipe, comprising the structural combination of a body with means for its permanent affixation to said pipe, at least one finger integral with said body, a tailpiece with means for its permanent affixation to said hose, an annular series of spaced projections on said tailpiece, into any one space of which the finger is instantly emplacable by axially confronting the body and tailpiece thereby to resist turning of the tailpiece relatively to the body by any twisting of the hose in use, a sleeve swiveled onto the body and having several equi-spaced simple projections, and a flange on the tailpiece, periodically recessed to admit passage of the projections and having cam edges for said projections to ride upon a turn of the sleeve to keep the finger confined to the occupied space.

2. A coupling comprising a body with means for the affixation of one of its ends to a pipe, a flange approximately at the free end of said body, said flange being the virtual base of at least one projecting finger, a sleeve swiveled onto the body and having several equi-spaced simple projections, a tailpiece with means for the affixation of one of its ends to a hose, a flange on the free end of said tailpiece, periodically recessed to admit passage of the projections and having cam edges for said projections to ride upon by a turn of the sleeve, and an annular series of spaced projections in said tailpiece made integral with the tailpiece, set back from the rim of the flange and located within the confines of the tailpiece flange thus to afford a rigid interlock for said finger when the finger is emplaced in an arbitrarily selected space.

FRANK A. McDONALD.